United States Patent [19]
Alfonso

[11] 4,138,139
[45] Feb. 6, 1979

[54] COLLAPSIBLE TRASH CARRIER

[76] Inventor: Berta C. Alfonso, 9835 SW. 53 Terr., Miami, Fla. 33165

[21] Appl. No.: 863,123

[22] Filed: Dec. 22, 1977

[51] Int. Cl.² ............................................. B62B 11/00
[52] U.S. Cl. .................................... 280/652; 248/98
[58] Field of Search ............... 280/652, 651, 654, 641; 248/98

[56] References Cited

U.S. PATENT DOCUMENTS

| | | | |
|---|---|---|---|
| 2,847,227 | 8/1958 | Lankford | 248/98 |
| 2,872,202 | 2/1959 | Tripoli | 280/654 |
| 3,633,932 | 1/1972 | Holden | 280/641 |
| 3,640,547 | 8/1972 | Friedman | 280/652 |
| 3,754,771 | 8/1973 | Shagoury | 280/654 |

*Primary Examiner*—Robert R. Song

[57] ABSTRACT

A collapsible trash carrier which is wheeled for use in supporting a disposable plastic bag. The carrier is composed of a first and second pair of pivotal scissor type legs each having an upper end supporting a ring structure and a lower end provided with wheels so that the mouth of a plastic bag can be folded over the top of the ring and a tray is utilized between the legs to support the bottom of the bag. A keeper in the form of a ring with an annular recess sized to nest over the ring structure to hold a bag mouth zone is provided to keep the bag in position until it is full and to, thereafter, be removed for removal of the bag to dispose of it. The device is composed of pivotally interconnected parts for collapsibility.

5 Claims, 4 Drawing Figures

COLLAPSIBLE TRASH CARRIER

FIELD OF THE INVENTION

This invention relates to a wheeled carrier especially useful for supporting trash bags.

BACKGROUND OF THE INVENTION

There have been numerous types of wheeled carts and the like for various reasons. This invention is of a wheeled carrier especially adapted to support a plastic bag of the disposable type in an open condion for use in collecting trash, transporting it to a station to be picked up and which carrier may be readily collapsed when not in use.

Generally speaking, it is an object of this invention to provide an improved trash carrier for use with a plastic bag to hold it in an open condition while it is being loaded and which carrier includes wheels for moving the trash to a pick-up station and wherein the carrier is collapsible for easy storage when not in use.

In accordance with these and other objects which will become apparent hereinafter the instant invention will now be described with reference to the accompanying drawings, in which:

DESCRIPTION OF THE PREFERRED EMBODIMENT

Figures 1, 2:
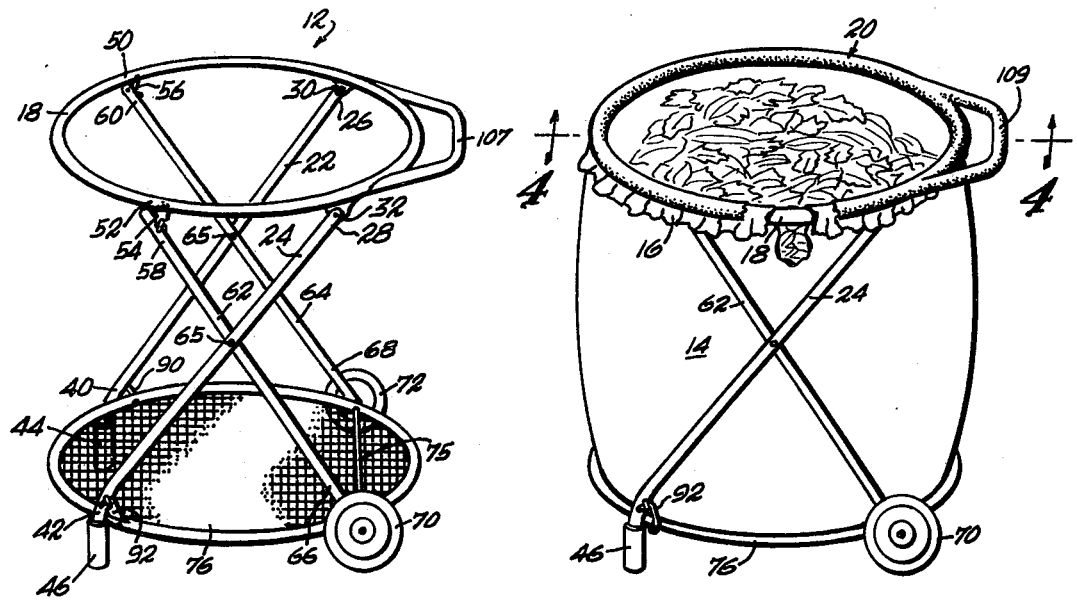
FIG. 1 is a perspective view illustrating the instant invention.
FIG. 2 is a view similar to FIG. 1 which has been partially broken away and showing the instant invention in use.
Figure 4:
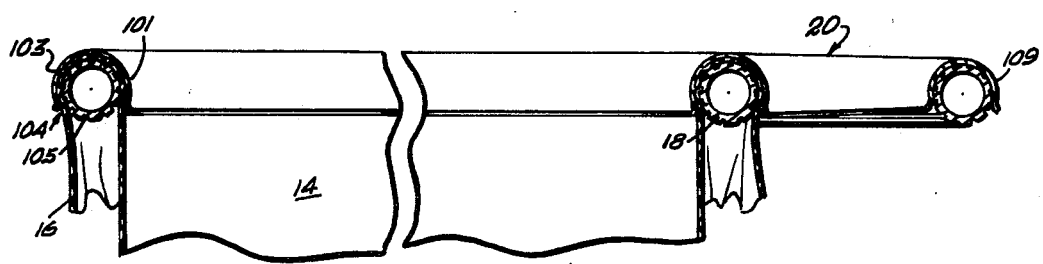
FIG. 4 is a partial view of that upper portion of FIG. 2 taken on the plane indicated by the line 4—4 of FIG. 2 and looking in the direction of the arrows.

Referring to the drawings wherein like reference characters designate like or corresponding parts throughout the several views there is shown a wheeled trash bag carrier which is generally designated by the numeral 12. It is for the purpose of supporting a plastic bag 14 for holding leaves and wherein the upper lip 16 is turned back over the upper ring structure 18 of the carrier as shown in FIG. 2 and held in place by a keeper 20 which is generally U-shaped in cross section, as is seen in FIG. 4. In depending relation from the ring there are a pair of legs which are designated by the numeral 22 and 24 which have upper ends 26 and 28 which are pivotally connected in a clevis connection as at 30 and 32 to the ring structure. These legs extend forwardly and downwardly to a lower end zones 40 and 42 over which there are connected cup-shaped caps 44 and 46. At the upper ring zones indicated by the numerals 50 and 52 on the opposite sides of the forward portion of the ring structure there are connector means 54 and 56 for connecting the upper ends 58 and 60 of a pair of downwardly extending legs 62 and 64 each of which is provided at their respective lower terminal ends 66 and 68 with a wheel 70 and 72 which are journaled thereto on an axle 75. Pairs of legs 22, 24 and 62, 64 are respectively pivotally connected intermediate their lengths as by pins 65 in scissor fashion for collapsibility of the carrier. Finally, there is a support tray 76 which spans the legs; the tray is connected in a pivot connection to the lower end of the legs 62 and 64 respectively and is connected to the forward legs by pivotal hook means 90 and 92.

Figure 3:
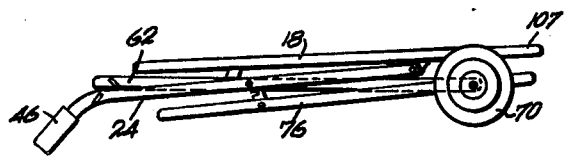
FIG. 3 is a view of the device shown in FIG. 1 in a collapsed condition.

When not in use, the device may be collapsed to the condition shown in FIG. 3 by simply unhooking the upper ends of the legs 62 and 64 from the ring, and the tray from the lower ends of the legs 22 and 24 pivoting the members together as in FIG. 3. When in use, as shown in FIG. 1, the bag 14 is suspended from the ring; and the keeper is positioned over it. The keeper may be of a ring-type structure having the side surfaces 101 and 103 with a mouth 104 defined therebetween. The keeper is of yieldable plastic material with a memory and sized to tightly grip the inside and outside of the upper ring structure, which may be knurled as indicated at 105 for a better grip to keep a bag in position, see FIG. 4. Additionally, handle means are provided on the upper structure as indicated by the numeral 107 to tilt and wheel the carrier. It is noted that a portion 109 of the keeper member 20 overlays and grips this handle zone also in the preferred embodiment. The keeper may be readily removed by peeling it from the bag; and thereafter the bag may be lifted from the bag carrier to be deposited at a convenient location. It is seen that the tray is disposed such that its relationship to the legs is such as to support the bottom of a companionately rigid disposable plastic bag.

What is claimed is:

1. For use with a disposable plastic trash bag having a mouth zone and a bottom, a wheeled collapsible trash carrier comprising a first and a second pair of spaced parallel legs, each pair comprising a downwardly and forwardly extending leg and a downwardly and rearwardly extending leg and first pivot means interconnecting the legs of each pair for relative scissor type movement and said first pivot means defining a common axis through the legs of each pair, each forwardly extending leg being of a common length and comprising an upper end and a lower end and said upper ends being coplanar at all times upon scissor movement of the legs, each rearwardly extending leg being of a common length and comprising an upper end and a lower end and said upper ends being coplanar at all times with one another upon scissor type movement of the legs and substantially coplanar with the upper ends of said forwardly extending legs, the lower ends of said forwardly extending legs comprising foot means, an axle of a predetermined length spanning the lower ends of said rearwardly extending legs, means rotatably connecting the lower ends of said rearwardly extending legs to the axle, and a wheel journaled on the axle adjacent each of the lower ends of said rearwardly extending legs, a generally planar support tray for a disposable plastic bag, said tray having a rear portion and a forward portion, said rear portion being mounted to said axle for swinging movement toward and away from said first pivot means, first mutually intercooperating hook means on the forward portion of said tray and adjacent the lower ends of said forwardly extending legs for hooked-up engagement of said tray at the forward portion to the lower ends of the forwardly extending legs, a ring structure with a rear portion and a forward portion, second pivot means connecting the upper ends of the forwardly extending legs to the rear portion of the ring structure for swinging movement of the forward portion of the ring structure toward and away from said first pivot means, second mutually intercooperating hook means on the upper end of the forward portion of the ring structure for hooking engaging with the upper ends of the rearwardly extending legs, said ring structure defining a closed loop of predetermined size and shape, said ring structure having an upper surface, downwardly extending side surfaces, and a bottom surface and said side surfaces each having a portion converging toward said bottom surface, and bag keeper means comprising a keeper ring of yieldable plastic material of a size substantially equal to said predetermined size and shape of said ring structure and said keeper means having an annular axially facing recess defining side surfaces and a top surface and said recess being companionately sized to receive said ring structure, said side surfaces defining a recess mouth between said side surfaces of said recess, said ring structure being adapted to be nested snugly in said recess with said recess mouth yieldably engaging said converging surface portions of said ring structure to releasably hold the bag mouth zone between the ring structure and keeper means in a bag open position while the bottom is supported on said tray.

2. The device as set forth in claim 1 wherein the lower ends of said forwardly extending legs are provided with downturned terminal end zones and cap means are provided.

3. The device as set forth in claim 1 wherein the ring structure is knurled on said top and side surfaces.

4. The device as set forth in claim 1 wherein said ring structure includes a rearwardly extending handle portion.

5. The device as set forth in claim 4 wherein said tray comprises an annular ring and screen means spanning the ring.

* * * * *